United States Patent [19]
Arthur et al.

[11] 3,969,663
[45] July 13, 1976

[54] CAPSTAN CONTROL FOR A TAPE DRIVE SYSTEM

[75] Inventors: William C. Arthur; William W. Steger, both of Boulder, Colo.

[73] Assignee: Storage Technology Corporation, Louisville, Colo.

[22] Filed: Oct. 17, 1974

[21] Appl. No.: 515,601

[52] U.S. Cl. .............................. 318/561; 318/603; 318/618; 318/374
[51] Int. Cl.² .......................................... H02P 1/04
[58] Field of Search ................... 318/6, 7, 561, 618, 318/571, 367, 373, 374, 603, 326, 434

[56] References Cited
UNITED STATES PATENTS

| | | | |
|---|---|---|---|
| 3,412,307 | 11/1968 | Welsh | 318/434 X |
| 3,435,310 | 3/1969 | Bradley | 318/571 |
| 3,435,314 | 3/1969 | Bradley et al. | 318/571 X |
| 3,500,163 | 3/1970 | Moritz | 318/373 |
| 3,644,806 | 2/1972 | Belson et al. | 318/7 |
| 3,721,882 | 3/1973 | Helms | 318/603 X |
| 3,728,565 | 4/1973 | O'Callaghan | 318/618 X |
| 3,737,751 | 6/1973 | Lima | 318/373 X |
| 3,764,876 | 10/1973 | Arthur | 318/326 |
| 3,809,335 | 5/1974 | Mantey | 318/7 |
| 3,836,833 | 9/1974 | Harris et al. | 318/618 X |

Primary Examiner—B. Dobeck
Attorney, Agent, or Firm—Woodcock Washburn Kurtz & Mackiewicz

[57] ABSTRACT

A control system for precisely locating a tape upon deceleration thereof from a transport velocity to rest. A signal is generated which represents the distance traversed by the tape subsequent to an identified event. The signal is compared with a reference signal representing a desired distance-versus-time characteristic, and the error signal thus given rise to is used to either "plug" or dynamic brake the motor to control the stopping distance. Final position control logic produces and additional enabling signal should the tape overrun its desired position, and causes the motor to reverse to reposition the tape. In a preferred embodiment, a current limit circuit monitors current through the drive motor, and intermittently disables a portion of the drive circuit in response to a sensed overcurrent condition.

17 Claims, 4 Drawing Figures

CAPSTAN CONTROL FOR A TAPE DRIVE SYSTEM

BACKGROUND OF THE INVENTION

The present invention relates to systems for controlling the transport of an element of indeterminate length and, more particularly, to tape drives adapted for use with computer systems wherein intermittent but precisely located transport of the tape is necessary.

In many computer applications, it is necessary to record or retrieve intelligence from a medium comprising a length of magnetic tape. In performing the recordation or retrieval, it is commonly necessary to periodically stop the advance of the tape abruptly pursuant a command from the computer, and subsequently re-initiate the transportation of the tape so that further portions thereof may be driven past a magnetic read/write head. Typically this movement is accomplished through a capstan drive system wherein the tape is wrapped partially around a capstan, the friction therebetween serving to transfer the tape from a supply reel to a take-up reel. Take-up mechanisms are commonly provided for maintaining a certain amount of slack in the tape on either side of the capstan, to mitigate the stress on the tape which arises from the sudden acceleration and deceleration of the capstan drive.

The sudden acceleration and deceleration of the tape imposes severe requirements upon the capstan control system. Changes in tape speed must be accomplished rapidly in order to maximize the amount of tape available for recording information. It is necessary too that the tape be stopped in a precise position; if it is stopped short access time to the next record on the next start command will be unduly long. If transport of the tape is allowed to continue unduly, insufficient distance will be left to allow the tape to be brought up to speed before reading the subsequent intelligence recorded upon the tape.

Many attempts have been made to provide means for controllably accelerating and/or decelerating transported tape. It has been found, however, that by closely controlling the deceleration characteristics of the system in such a way as to avoid "overrun" of the driven tape, satisfactory transport system operation may be maintained without the necessity for providing complex acceleration waveforms. This is due to the fact that if stopping characteristics are precisely tailored adequate distance can then be left on the tape to allow for a known acceleration characteristic.

Many of the prior art control systems have concerned themselves only with monitoring tape velocity, based on the fact that distance traveled is the time integral of velocity. While this approach has been relatively successful, systems employing it have oftentimes lacked the precision desired in modern-day tape transport mechanisms. It will therefore be appreciated that it would be highly desirable to provide an improved tape transport mechanism which precisely controls the distance traversed by a transported length of tape during deceleration thereof.

It is therefore an object of the present invention to provide improved means for decelerating a transported tape.

It is another object of the invention to provide improved means for precisely regulating the position of a transported tape after it is brought to rest.

It is still another object to provide a tape transport control which will allow the reversing of a capstan drive should an overly long distance be required to stop a transported tape.

Another object of the invention is to achieve improved current limitation in a tape transport system having superior deceleration characteristics.

SUMMARY OF THE INVENTION

These and other objects are achieved through the provision of at least one train of pulses representative of capstan rotation. The pulses are counted and, upon the arising of a "stop" signal, converted into an analog signal representative of the instantaneous position of the tape. A function generator, also energized in response to the stop signal, produces a reference signal whose waveshape corresponds to a desired position-versus-time characteristic. The two signals are algebraically combined and the error signal employed to either plug or dynamic brake the drive motor. Additional control logic monitors the distance traveled by the tape subsequent to the initiation of the stop signal and, if it exceeds a predetermined value, applies a reversing signal to the motor to cause the tape to be returned to the desired position. A current limit circuit continually monitors the motor drive, disabling a portion of the power circuitry when the sensed current is too high and re-enabling the circuitry after the current drops below the desired level. Circuit time delays, hysteresis and motor inductance cause the current to assume a saw tooth waveform about the desired limit level.

DETAILED DESCRIPTION OF A PREFERRED EMBODIMENT

Figure 1:
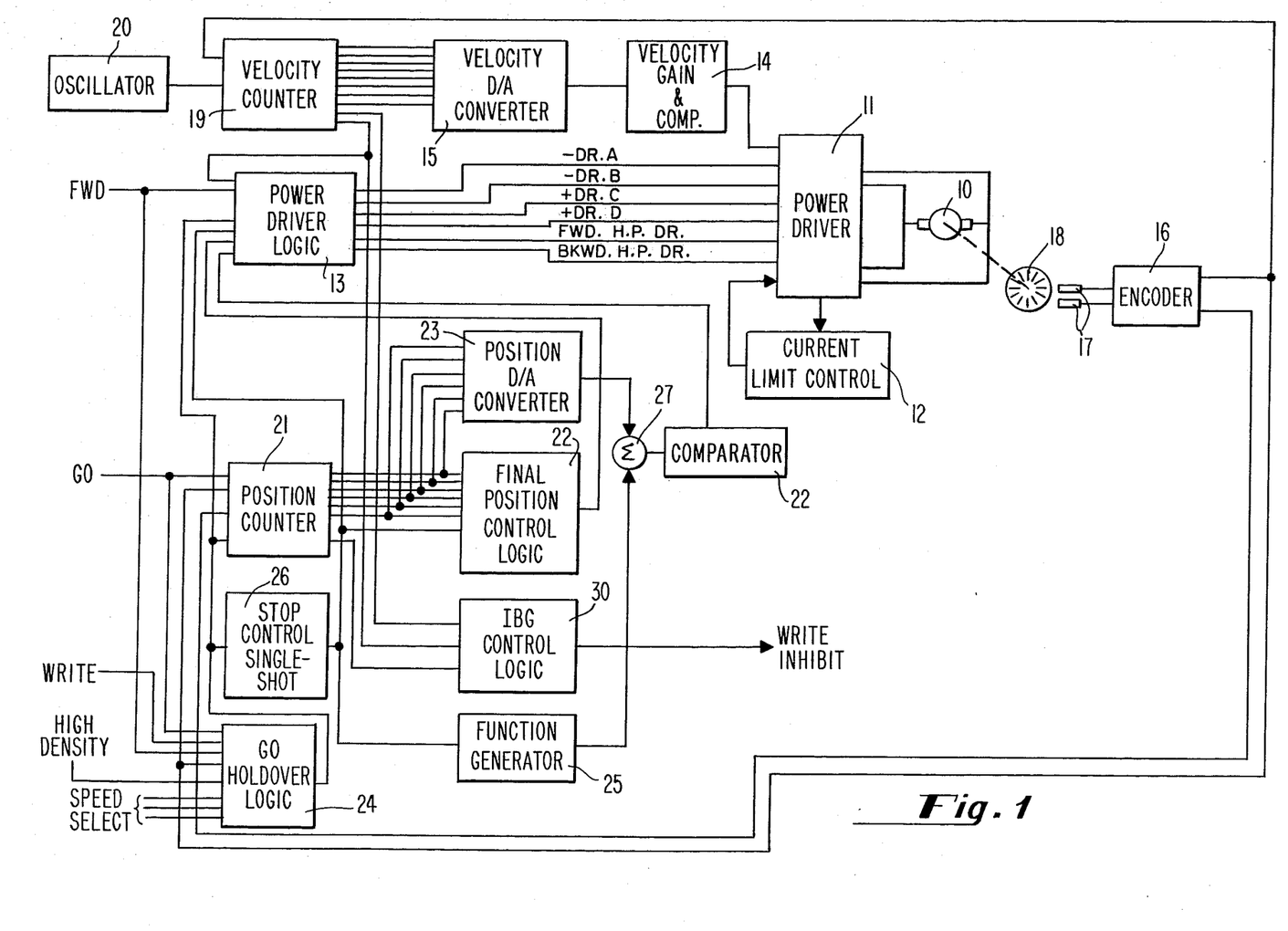
FIG. 1 is a schematic diagram illustrating a tape transport system utilizing the teachings of the present invention.

FIG. 1 represents a capstan drive control system suitable for use in a modern-day computer. A capstan (not shown) frictionally engages an element of indeterminate length such as a tape or web, advancing the element as it is rotated by capstan motor 10. While motor 10 may be of any suitable type, it is preferably a D.C. motor whose armature has a relatively low inertia and a high torque-to-weight ratio. The motor may be energized by switching elements such as power transistors arranged in a bridge or H-configuration such that by energizing transistors in a first pair of diagonally opposed arms of the circuit the motor drives in a forward direction. Conversely, by energizing transistors in the other, opposed circuit arms the direction of motor torque may be reversed. Such an arrangement is disclosed in detail in U.S. Pat. No. 3,764,876, filed Oct. 1, 1971, and assigned to the assignee of the present invention.

Also as taught in the foregoing patent, a control circuit is provided for varying the degree of conduction of the various power transistors, and therefore the voltage impressed across motor 10 and so the speed thereof. This function is represented by power driver 11 which receives commands from a current limit control 12, a power driver logic unit 13, and an analog control circuit 14. Under normal operating conditions, power driver 11 operates to start and to maintain tape velocity by controlling the operation of the motor 10 in accordance with signals received from power driver logic 13 and from signals from velocity d/a converter 15. An optical encoder 16 is provided, and linked by means of photoelectric pick-up 17 to a rotating disk 18 having elements formed thereon which interrupt a beam of light directed upon the pick-up elements. The signals thus derived are converted into a train of pulses by encoder 16 and transmitted to a velocity counter 19 which outputs digitally encoded signals representative of the sensed velocity of the capstan drive system. Typically, such signals are derived by counting the pulses from oscillator 20 which arise between the pulses supplied from encoder 16. If more than a predetermined number of oscillator pulses are interspersed between the encoder pulses a correction signal is generated to raise the speed of the capstan drive motor. Conversely, if too few pulses are accrued the drive motor 10 is allowed to slow down.

Optical encoder 16 is advantageously constructed so as to output a double train of pulses in response to the rotation of disk 18. The pulses are displaced by some predetermined phase angle, advantageously 90° so that by comparing the relative timing of the pulses of the two trains the direction of rotation of the capstan motor 10 may be determined. The pulse trains are applied to a position counter 21 which outputs encoded signals representative of rotation of disk 18, and thus the advancement of the driven tape, subsequent to some specified event. The encoded signals are then applied to final position control logic element 22, and a position d/a converter 23 to produce an analog signal whose instantaneous value represents the distance traversed by the driven tape after the specified event.

The power driver logic unit 13 is adapted to receive a FORWARD signal from a Tape Control Unit (TCU) which is converted into an appropriate drive signal as indicated on the output leads of the logic unit. The GO signal from the TCU is conditioned to a GO-1 signal by the GO holdover logic 24 and used as a gating signal to the Power Driver Logic. Such signals are commonly available from the control units associated with the tape transport systems of the type illustrated, and are used for conventional tape drives such as the IBM 2420 Model 5 tape unit.

The discontinuance or "dropping" of the GO signal is utilized to initiate deceleration of the transported tape. The GO signal is applied to GO Holdover Logic 24 and position counter 21, which is thus preset. Upon the dropping of the GO signal and after receiving a predetermined number of pulses from encoder 16, the GO HOLDOVER logic acts to apply a GO-1 enabling signal to a stop control 26, power driver logic 13 and position counter 21. A function generator 25 is subsequently enabled by stop control 26 to apply a reference signal to a summing network 27, from whence the algebraic sum of the function generator signal and analog signal from converter 23 are applied to a comparator 28. When stop control 26 subsequently times out it disables function generator 25 and enables final position logic element 22.

The operation of the system will now be discussed in detail, making specific reference to the enumerated elements of FIG. 1. When it is desired to advance or transport the tape the power drive logic, block 13, is conditioned by the suitable FORWARD signal, and a GO-1 signal is applied for initiating the appropriate power signals to driver 11. As the operation of this portion of this system is fully described in U.S. Pat. No. 3,764,876, its operation will not be set forth in detail herein. When it is desired to stop the tape, and therefore, to begin an inter block gap (IBG) an appropriate signal, herein corresponding to an absence or "dropping" of the GO signal ocurs. The motor 10 continues to be driven at a nominal read/write velocity by the gain an compensation circuit 14. The absence of the GO signal causes position counter 21 to be reset to a value corresponding to a predetermined count. The absence or dropping of the GO signal also activtes GO HOLDOVER logic circuit 24 so that, depending upon the conditioning of element 24 by density and speed signals, the logic circuit produces a GO-1 signal after the application thereto of a number of pulses corresponding to a predetermined numer of lines counted from disk 18. After the disk has rotated a certain number of lines, corresponding to an advancement of the tape by a desired distance, GO HOLDOVER element 24 produces a GO-1 signal which is applied to position counter 21, stop control 26, and power driver logic 13. When the GO-1 signal drops it causes position counter 21 to begin producing step-wise pulses representative of counted pulses from encoder 16. Stop control 26, which comprises a time delay device, commences its timing cycle, a function generator 25 begins to output a characteristic waveform. The foregoing activities can be discerned from the waveforms of FIG. 2; waveform A corresponds to the GO signal, waveform B corresponds to the GO-1 signal, and waveform C corresponds to pulses of one of the wave trains outputted by encoder 16. Waveform D represents the output of d/a converter 23, whose starting value (that existing at termination of the GO-1 signal) corresponds to a predetermined count. Waveform E, on the other hand, represents the signal produced by function generator 25. The dotted portion denotes the balance of the function which would arise if operation of function generator 25 were not first terminated. The function is advantageously of parabolic form, having the form $y = ax^2 + bx + c$ and corresponding to a desired instantaneous position-versus-time characteristic of the decelerating tape.

Figure 2:
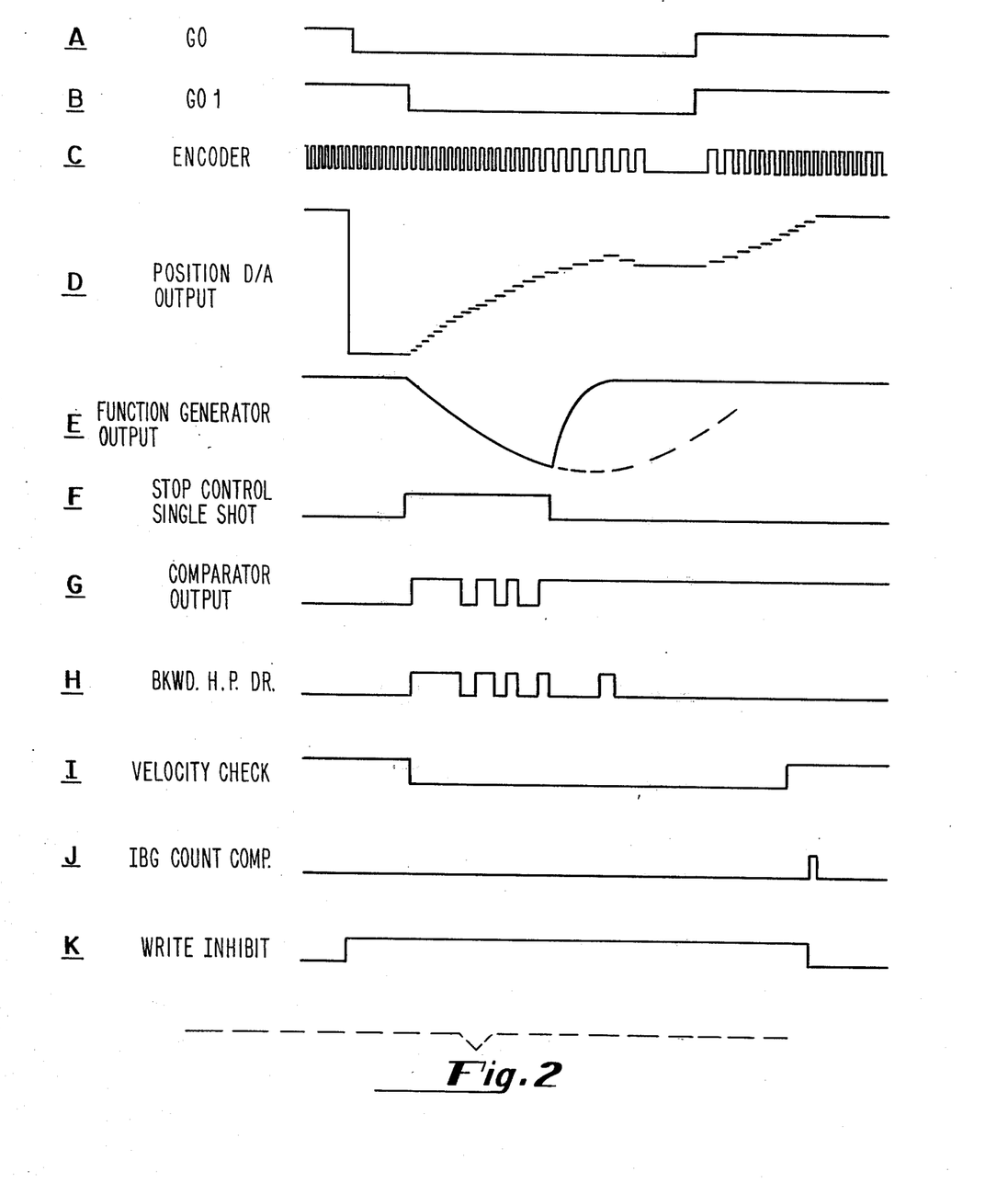
FIG. 2 depicts certain of the signals produced at various points within the system.

It will be seen that the output of converter 23 and the waveform of function generator 25 are substantially mirror images of one another. Should the position-versus-time characteristic of the decelerating tape correspond to the function generator output, the algebraic sum of the curves will be zero. This sum is taken at summing junction 27; any difference arising between the two signals is applied to comparator 28. A positive error signal, corresponding to insufficient deceleration, gives rise to a high or "up" logic level at the comparator output and the resultant signal is transmitted to the power drive logic 13. The applied signal is utilized to produce a BKWD H. P. drive signal for effecting the plugging, or reverse-torque operation, of motor 10. As motor speed diminishes, the instantaneous change of tape travel as a function of time declines until the error signal disappears. Waveform G of FIG. 2 depicts the discrete pulsed output of comprator 28, while signal H depicts the response of power drive logic 13. At this time comparator 28 ceases to produce a plugging signal and the motor 10 is allowed to be slowed under the influence of dynamic braking only. This activity continues, with the motor drive circuitry switching back and forth from plugging to dynamic braking modes to cause the position-versus-time characteristic of the motor to closely follow the signal output by function generator 25.

After a predetermined period of time has elapsed, stop control 26 times out as shown at curve F of FIG. 2 and disables function generator 25, allowing the signal produced thereby to retun to its quiescent level as shown in waveform E. The stop control signal also conditions the power drive logic 13 to accept an addional backward high-power drive signal from final position control 22. During the deceleration process, final position control 22 receives encoded signals from position counter 21. Should the count received be in excess of that corresponding to the desired deceleration distance, control 22 outputs a signal which in conjunction with the stop control signal, effects a plugging or backward high-power drive signal for motor 10. While not necessary in practicing the instant invention, it may be desirable to apply less than full backward power to the motor; this may conveniently be accomplished by resetting the threshold of operation of current limit control 12. Since its forward rotation has ceased, the motor then reverses and translates the tape back past a point represented by the end of the desired deceleration distance. This activity is represented by waveform D of FIG. 2.

Upon next starting the inner block gap control 30 monitors the capstan velocity through velocity counter 19 and position from position counter 21. As the tape drive begins to accelerate the displacement of the tape causes position counter 21 to count up to its desired value, at which point an IBG count complete signal (waveform J) is applied to IBG logic circuit 30. If the velocity of the tape is within desired limits, the WRITE INHIBIT signal is disabled allowing a write operation to start (waveform K of FIG. 2). This assures that writing cannot be initiated until the distance between the previous record and the next one is no less than a predetermined length and that the tape velocity is close to the normal "write" velocity. IBG distance is then the sum of the write go-holdover, stop and start distances.

Figure 3:
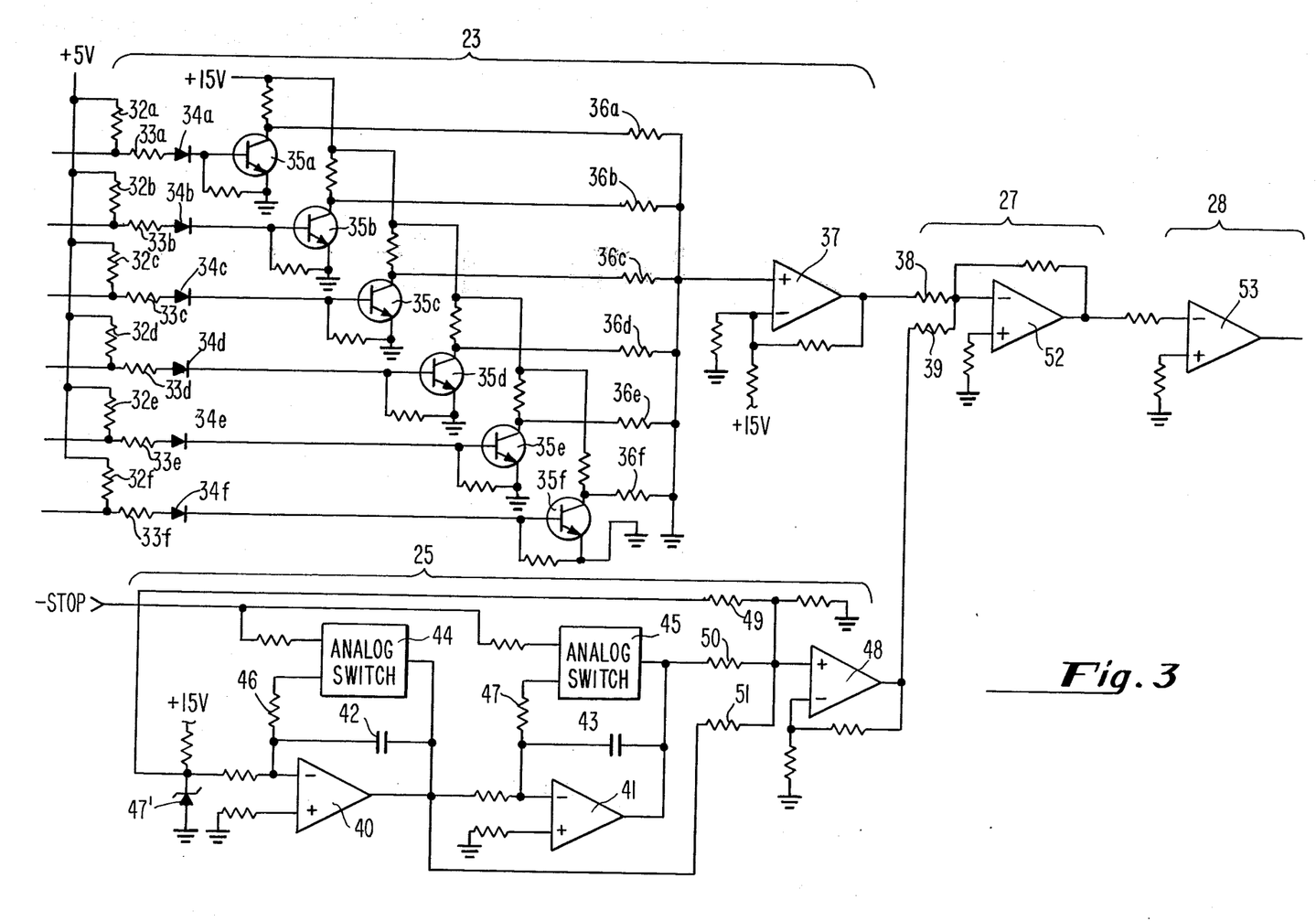
FIG. 3 is a detailed circuit schematic diagram setting forth details of certain elements of the system.

Turning now to FIG. 3, there is shown in detail certain of the elements comprising the d/a converter 23, summing junction 27, and comparator 28 of FIG. 1. Six inputs are shown, for receiving digitized signals from position counter 21 (not shown) in the usual binary fashion. Biasing resistors 32a–f apply a positive bias of 5 volts to the input terminals, while resistors 33a–4 and diodes 34a–f transmit the pulses to transistors 35a–f. The signals arising at the collector terminals of the transistors are passed through resistors 36a–f, which are weighted in the usual binary manner, to one input of an operational amplifier 37. This gives rise to an analog signal whose instantaneous value reflects the angular displacement of disk 18, and thus the displacement of the transported tape, from the time of energization of the counting system. In one successfully testd embodiment, the output of amplifier 37 ranged from −10 to +10 volts, covering a range of 64 "counts" or disk increments. The desired stop level, 0 volts, represents a count of 32 increments such that if it is wished to utilize, say, 20 increments in deceleration the system must first be conditioned to a value of 12 increments or approximately −6.3 volts as can be seen from waveform D of FIG. 2.

The conditioned analog signal produced by amplifier 37 is summed at element 27, which comprises resistors 38 and 39 and operational amplifier 52. Resistor 39 serves to couple the output of function generator 25 to the summing node. The function generator may advantageously be comprised of operational amplifiers 40, 41 connected as integrators by means of feedback capacitors 42 and 43 respectively and summing amplifier 48. Each of the capacitors is shunted by means of an analog switch 44, 45 operated in response to a "stop" signal from stop control 26. The analog switches are operative to shunt the capacitors through current limiting resistors 46 and 47. As will be appreciated by those skilled in the art, the cascading of amplifiers 40, 41 produces an increasing voltage whose curve is determined by the values of the various resistors and capacitors used in the networks associated therewith. The voltage waveforms thus produced are summed, along with the voltage supported across a zener diode 47', at a final amplifier 48 by way of a network of suitably sized resistors 49, 50 and 51 whose values are selected to tailor the resultant curve to the position-versus-time characteristic desired for the decelerating tape.

The signal appearing at the output of summing network 27 is applied to one input of a comparator 53 connected so as to produce an error signal when the algebraic sum of the signals produced by d/a converter 23 and function generator 25 exceeds some minimum positive value. As has been described hereinabove, the resulting signal outputted by the comparator triggers the plugging operation of drive motor 10. The plugging persists until the error signal declines below some threshold value, at which point it ceases and power driver 11 effects dynamic braking of the motor.

Figure 4:
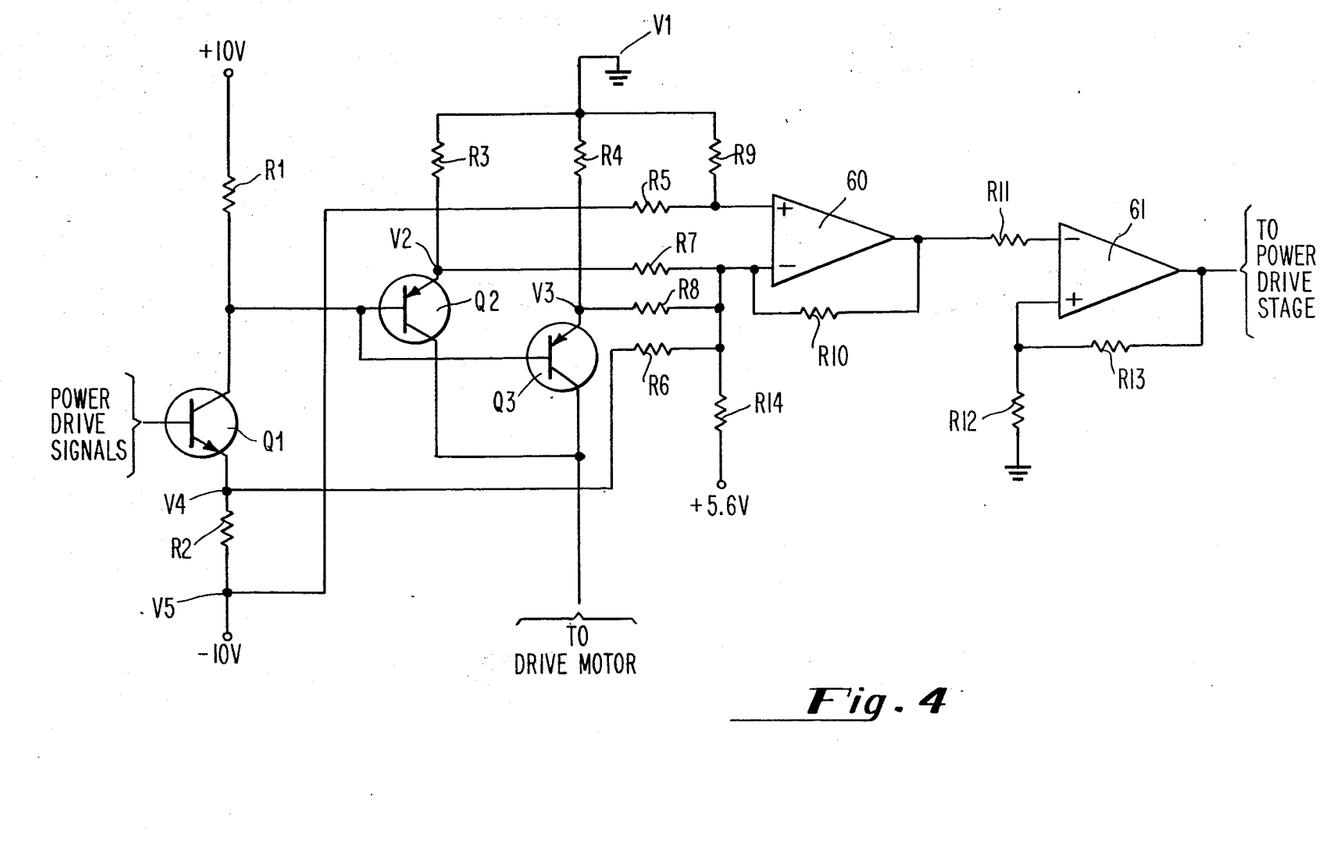
FIG. 4 is a schematic circuit drawing showing details of the current limit circuit used in the system of FIG. 1.

Turning now to FIG. 4, there is depicted a current limit circuit adapted for use with the capstan drive control system of FIG. 1 and containing portions of those elements designated therein as Nos. 11 and 12.

More specifically, a pre-driver transistor $Q_1$ receives a signal for allowing current flow through one arm of the bridge or H-type motor drive circuit. Again, the motor drive circuit is advantageously of the same type disclosed in U.S. Pat. No. 3,764,876 in which diagonally opposing arms of the bridge or H control circuit are energized to provide current flow through a motor.

In order to limit current in both the forward and reverse direction it is necessary to monitor two parallel circuit arms; however, since the circuits are substantially identical only the current limit for one arm will be described. Pre-drive transistor $Q_1$ receives a power drive signal constituted by a fixed-magnitude, high power (H.P.) signal to drive parallel output transistors $Q_2$, $Q_3$, for providing the requisite power to drive motor 10. Pre-drive transistor $Q_1$ is coupled between positive and negative voltage sources of 10 volts each through resistors $R_1$ and $R_2$. The emitter terminals of output transistors $Q_2$, $Q_3$, are coupled to a source of reference potential, shown herein as ground, through resistors $R_3$ and $R_4$, respectively, while the collectors thereof are coupled to one terminal of driver motor 10 (not shown). The voltage arising across resistor $R_2$ is coupled to the positive and negative terminals of an operational amplifier 60 through resistors $R_5$ and $R_6$, respectively, while the emitter terminals of output transistors $Q_2$ and $Q_3$ are coupled to the negative terminal of the amplifier through resistors $R_7$, $R_8$. A feedback resistor $R_{10}$ is provided about amplifier 60 and a comparator 61, is coupled to amplifier 60 by means of a resistor $R_{11}$. Resistor $R_{13}$ in combination with bias resistor $R_{12}$ provides hysteresis in the comparator 61. Resistor $R_{14}$ applies a suitable biasing potential to the negative input terminal of amplifier 60 for establishing the desired current level.

When comparator 61 is gated into operation it produces a negative logic signal which is fed back to the power driver logic, and acts to disable the drive signal applied to the base of the pre-drive transistor $Q_1$ in response to a current flow through the power transistors in excess of some predetermined amount. This amount can be easily determined by properly sizing resistors $R_5$, $R_6$, $R_7$ $R_8$ and $R_9$ in the following manner.

With the motor energized in the forward direction, and the depicted circuit arm conducting the motor current will be the sum of the emitter currents of transistors $Q_2$ and $Q_3$, minus the base drive currents thereof. As will be appreciated by those skilled in the art, the base drive current is substantially equal to the emitter current of the drive transistor $Q_1$. In order to facilitate the following explanation, the voltage appearing at the emitter terminal of transistor $Q_1$ will be denominated $v_4$ while the negative bias at the opposite side of resistor $R_2$ will be denominated $v_5$. The reference potential shown herein as ground is denominated $v_1$, while the emitter voltages of output transistors $Q_2$, $Q_3$ are denominated $v_2$ and $v_3$, respectively. Now motor current $i_m$ may be equated to the expression $$i_m = \frac{v_1 - v_2}{R_3} + \frac{v_1 - v_3}{R_4} - \frac{v_4 - v_5}{R_2}$$

or $$i_m = v_1 \left( \frac{1}{R_3} + \frac{1}{R_4} \right) - \frac{v_2}{R_3} - \frac{v_3}{R_4} - \frac{v_4}{R_2} + \frac{v_5}{R_2}$$

It is assumed that a balanced, non-saturated operational amplifier such as that shown at 60 will have zero volts at the input terminals thereof, so that the sum of the currents $i_s$ appearing at the input terminals may be expressed as $$i_s = \frac{V_1}{R_9} + \frac{V_5}{R_5} - \frac{V_2}{R_7} - \frac{V_3}{R_8} - \frac{V_4}{R_6}$$

It will now be apparent that there must be some constant $K$ such that $$KR_9 = \frac{R_3 R_4}{R_3 + R_4};$$

$KR_5 = R_2$; $KR_6 = R_2$; $KR_7 = R_3$; and $KR_8 = R_4$.

By properly sizing resistors $R_5$ through $R_9$ it will be understood that the current inputs to comparator 60 can be made to track motor current such that comparator 60 will output a signal in response to motor current above some predetermined limit. As set forth above, the effect of the actuation of comparator 61 is to apply an amplified disabling signal to the power drive circuitry for terminating motor current. After some time delay, whose value is primarily a function of transistor parameters, if current through the transistors has declined to an allowable level the drive signal is reapplied to transistor $Q_1$ and the output transistors reenergized. Due to the turnoff delay inherent in the drive transistors, the system has adequate hysteresis for satisfactory operation. The inductance of the motor, and the presence of the freewheel diodes connected thereabout in the usual fashion allow motor current to continue, though at a declining rate, during the off-times of the power transistors.

It will therefore be appreciated that the apparatus described hereinabove constitutes an improved capstan drive control system with superior stopping control characteristics, and providing limitations on transistor current for controlling and protecting the system. While it is contemplated that the system disclosed herein constitutes the best embodiment for present purposes, it should be understood that many modifications and applications can be made to the disclosed apparatus to suit particular conditions and applications. It is therefore anticipated that the claims hereof shall cover all such modifications and applications as do not substantially depart from the system disclosed herein.

We claim:

1. In a system for controlling the transport of an element of indeterminate length and including drive means for frictionally engaging the element, and means for producing a deceleration signal, means for controlling the deceleration of the element comprising:

encoder means coupled to the drive means for producing a signal indicative of the distance traversed by the element subsequent to the deceleration signal;

decoder means for receiving the distance signal and outputting a position signal representative of the distance traveled by said element subsequent to the deceleration signal;

a function generator energizable in response to said deceleration signal for producing a reference signal representative of a desired position-versus-time characteristic;

signal combining means coupled to said decoder means and said function generator for receiving said position signal and said reference signal and outputting an error signal representative of difference therebetween; and a power circuit coupled to said signal combining means for energizing the drive means in response to said error signal to cause a fixed length of the element to be transported subsequent to the occurrence of the deceleration signal.

2. The invention defined in claim 1, further including circuit means for delaying the initiation of deceleration until a predetermined length of said element has been transported subsequent to the initiation of said deceleration signal.

3. The invention defined in claim 2, further including circuit means for disabling said function generator a predetermined period after the energization thereof.

4. The invention defined in claim 3, wherein said power circuit effects plugging of the drive means in response to said error signal.

5. The invention defined in claim 4, further including a final position circuit coupled to said decoder means and adapted to output a signal upon the detection of the passage of a length of said element in excess of said predetermined length; and means coupling said power circuit to said final position detector for effecting the reversal of said drive means to place said element at a desired position.

6. The invention defined in claim 5, further including current limit means coupled to said power circuit for disabling said power circuit when current transmitted thereby exceeds some predetermined limit.

7. In a tape transport system, including a capstan for frictionally engaging the tape, a capstan drive, means for controlling the distance required for deceleration of a tape from a first speed to a second speed comprising;
- a drive motor for rotating the capstan at a desired rate;
- an encoder coupled to the capstan drive for producing pulses indicative of capstan angular displacement;
- position decoding means for receiving said pulses and outputting a position signal representative of travel of the tape subsequent to the commencement of a deceleration signal;
- a function geneator energizable in response to the deceleration signal to produce a selected waveform representative of the desired instantaneous position of the tape;
- summing means for receiving the position signal and selected waveform and for outputting an error signal proportional to the algebraic sum thereof; and
- a drive circuit coupled to said summing means and responsive to said error signal to effect deceleration of the motor.

8. The invention defined in claim 7, wherein said drive circuit comprises means responsive to an error signal of a given value to effect plugging of the motor.

9. The invention defined in claim 8, wherein said drive circuit effects dynamic braking of the motor in the presence of an error signal below said given value.

10. The invention defined in claim 9, further including a current limit circuit coupled to said drive circuit for limiting current flow through said motor to a predetermined maximum value.

11. The invention defined in claim 10, further including time delay means for disabling said function generator a predetermined period after energization thereof.

12. The invention defined in claim 10, further including logic means coupled to said position decoding means and said drive circuit and operable to energize said drive circuit for reversing said motor upon translation of the tape or web beyond a predetermined distance.

13. The invention defined in claim 12, wherein said predetermined period is variable as a function of system operation.

14. The invention defined in claim 13, wherein said encoder produces two trains of pulses displaced one from the other by a predetermined phase angle, said pulse trains serving to denote direction of rotation of said capstan.

15. The invention defined in claim 14, wherein the waveform produced by said function generator is characterized by the equation $y = Ax + Bx^2 + C$, where $A$, $B$, and $C$ can represent either positive or negative values.

16. In a tape transport system comprising means for reeling and unreeling the tape, means for resiliently absorbing slack in the tape, a capstan for drivingly engaging the tape, and drive means including a motor for rotating the capstan and a power circuit for energizing the motor, means responsive to a stop command to cause the tape to stop after a predetermined length thereof has been transported comprising:
- an encoder coupled to said capstan and operative to produce a train of pulses proportional to the angular rotation of the capstan;
- a position counter coupled to the encoder and operative to produce signals indicative of capstan rotation;
- a position converter for receiving signals outputted by said position counter and for outputting an analog signal representative of the angular rotation of said capstan subsequent to an enabling signal;
- a function generator responsive to said stop command for producing a signal representative of the desired instantaneous position of the tape;
- combining means for receiving the signals produced by said position converter and said function generator and outputting a signal proportional to the algebraic sum thereof;
- circuit means coupled to the power circuit and responsive to said stop command to effect dynamic braking of the drive motor;
- a comparator coupled to said combining means and responsive to an error signal of a predetermined level to cause said power circuit to effect a plugging of the drive motor; and
- a final position control means coupled to said position counter and operative to produce an enabling signal when the length of tape in excess of said predetermined length has been transported after said stop command.

17. The invention defined in claim 16, wherein said power circuit includes a plurality of resistors, further including current limit means comprisng amplifier means having input terminals coupled across certain of the power circuit resistors by means of yet other resistors for outputting a current signal proportional to motor current flow; and
- a comparator coupled to said amplifier means for applying a disabling signal to said power circuit when said current signal exceeds some predetermined value.

* * * * *

UNITED STATES PATENT OFFICE
CERTIFICATE OF CORRECTION

Patent No. 3,969,663    Dated July 13, 1976

Inventor(s)  William C. Arthur et al

It is certified that error appears in the above-identified patent and that said Letters Patent are hereby corrected as shown below:

Abstract, line 10, "and" should read --an--.

Col. 4, line 13, "activtes" should read --activates--;

line 18, "numer" should read --number--;

line 63, "comprator" should read --comparator--.

Col. 5, line 8, "retun" should read --return--;

line 49, "33a-4" should read --33a-f--;

line 58, "testd" should read --tested--.

Col. 9, line 14, "geneator" should read --generator--.

Col. 10, line 44, "comprisng" should read --comprising--.

Signed and Sealed this

Twenty-sixth Day of October 1976

[SEAL]

Attest:

RUTH C. MASON
Attesting Officer

C. MARSHALL DANN
Commissioner of Patents and Trademarks